United States Patent [19]

Sedorcek et al.

[11] Patent Number: 5,462,334
[45] Date of Patent: Oct. 31, 1995

[54] SPORT UTILITY SEAT FOR REMOVABLE ATTACHMENT TO AN OPEN TRUCK AND BUMPER OF AN AUTOMOBILE

[76] Inventors: Frank J. Sedorcek; Jacqueline J. Sedorcek, both of 5644 Walmer St., Mission, Kans. 66202

[21] Appl. No.: 223,009

[22] Filed: Apr. 5, 1994

[51] Int. Cl.[6] ................................................ A47C 1/08
[52] U.S. Cl. ........................ 297/252; 297/256; 297/352
[58] Field of Search ............................. 297/250.1, 252, 297/255, 256, 331, 352

[56] References Cited

U.S. PATENT DOCUMENTS

| 540,034 | 5/1895 | Swan | 297/256 |
|---|---|---|---|
| 2,612,207 | 9/1952 | Branson | 297/252 X |
| 3,026,142 | 3/1962 | Holloway | 297/252 |
| 3,041,108 | 6/1962 | Cohn | 297/250.1 X |
| 3,428,361 | 2/1969 | Reynolds | 297/256 X |

FOREIGN PATENT DOCUMENTS 601476  11/1932  Germany ........................ 297/352

Primary Examiner—Laurie K. Cranmer

[57] ABSTRACT

A sport utility seat for removable attachment to an open truck and bumper of an automobile section comprising a seat portion formed in a rectangular configuration and positionable in a horizontal orientation with side edges and a front and a rear edge and with an upper surface and a lower surface; a back portion formed in a rectangular configuration and positionable in a vertical orientation with a front surface, side edges and a top and bottom edge and with a rear surface, the top and bottom edges being of a length essentially equal to the front and rear edges of the seat portion; a pair of hinges coupling the back and seat portions; a pair of inverted U-shaped clamping members with vertical legs and a cross piece secured to the rear surface of the back portion with two associated coupling bolts for each member, the upper extent of each member being at a height beneath the upper edge of the back portion and extending downwardly to a central extent of the back portion; and an adjustable wing nut extending through the leg of each member remote from the bolts and adjacent to a lower extent thereof with a hemispherical cup secured to the free end of the nut interior of the member with an operator control member exterior thereof.

1 Claim, 4 Drawing Sheets

SPORT UTILITY SEAT FOR REMOVABLE ATTACHMENT TO AN OPEN TRUCK AND BUMPER OF AN AUTOMOBILE

BACKGROUND OF THE INVENTION

1. Field of the Invention

The present invention relates to a new and improved sport utility seat for removable attachment to an open truck and bumper of an automobile and, more particularly, pertains to removably positioning a sports utility seat over an open trunk and bumper of an automobile.

2. Description of the Prior Art

The use of sports utility seats and other chairs is known in the prior art. More specifically, sports utility seats and other chairs heretofore devised and utilized for the purpose of providing a seat at a predetermined location by a user are known to consist basically of familiar, expected, and obvious structural configurations, notwithstanding the myriad of designs encompassed by the crowded prior art which has been developed for the fulfillment of countless objectives and requirements.

The prior art discloses a large number of sports utility seats and other chairs. By way of example, U.S. Pat. No. 3,552,788 to Christensen discloses a trunk seat.

U.S. Pat. No. 3,865,431 to Zakhi discloses a vehicle bumper seat.

U.S. Pat. No. 3,994,529 to Lippert discloses a stadium seat.

U.S. Pat. No. 4,781,413 to Shumack, Jr. discloses a portable stadium seat.

Lastly, U.S. Pat. No. 4,871,209 to Handelman discloses a folding stadium seat.

In this respect, a sport utility seat for removable attachment to an open truck and bumper of an automobile according to the present invention substantially departs from the conventional concepts and designs of the prior art, and in doing so provides an apparatus primarily developed for the purpose of removably positioning a sports utility seat over an open trunk and bumper of an automobile.

Therefore, it can be appreciated that there exists a continuing need for a new and improved sport utility seat for removable attachment to an open truck and bumper of an automobile which can be used for removably positioning a sports utility seat over an open trunk and bumper of an automobile. In this regard, the present invention substantially fulfills this need.

SUMMARY OF THE INVENTION

In view of the foregoing disadvantages inherent in the known types of sports utility seats and other chairs now present in the prior art, the present invention provides a new and improved sport utility seat for removable attachment to an open truck and bumper of an automobile. As such, the general purpose of the present invention, which will be described subsequently in greater detail, is to provide a new and improved sport utility seat for removable attachment to an open truck and bumper of an automobile and methods which have all the advantages of the prior art and none of the disadvantages.

To attain this, the present invention essentially comprises a new and improved sport utility seat for removable attachment to an open truck and bumper of an automobile comprising, in combination, a seat portion formed in a rectangular configuration and positionable in a horizontal orientation with side edges and a front and a rear edge and with an upper surface and a lower surface; a back portion formed in a rectangular configuration and positionable in a vertical orientation with a front surface, side edges and a top and bottom edge and with a rear surface, the top and bottom edges being of a length essentially equal to the front and rear edges of the seat portion and with the side edges of the back portion being of a length less than the side edges of the seat portion; a pair of hinges secured to the lower side edges of the back portion and the rear side edges of the seat portion, each hinge including a pair of pins secured through the hinge and coupled to the back portion with a single pivotable pin coupling the lower portion of the hinge and the seat portion forwardly of the front surface of the back portion to thereby allow the upward pivoting of the seat portion into a parallel orientation with the back portion; a pair of inverted U-shaped clamping members with vertical legs and a cross piece secured to the rear surface of the back portion with two associated coupling bolts for each member, the upper extent of each member being at a height beneath the upper edge of the back portion and extending downwardly to a central extent of the back portion with a cover sheet secured to the interior surface of one leg of the member to cover the heads of the bolts; an adjustable wing nut extending through the leg of each member remote from the bolts and adjacent to a lower extent thereof with a hemispherical cup secured to the free end of the nut interior of the member with an operator control member exterior thereof; and a support bracket extending downwardly from the lower surface of the seat portion in an arcuate configuration for resting on the bumper of an automobile when the inverted U-shaped member is secured to the rear of the trunk area when the trunk is open.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sport utility seat for removable attachment to an open truck and bumper of an automobile which has all the advantages of the prior art sports utility seats and other chairs and none of the disadvantages.

It is another object of the present invention to provide a new and improved sport utility seat for removable attachment to an open truck and bumper of an automobile which may be easily and efficiently manufactured and marketed.

It is a further object of the present invention to provide a new and improved sport utility seat for removable attachment to an open truck and bumper of an automobile which is of a durable and reliable construction.

An even further object of the present invention is to provide a new and improved sport utility seat for removable attachment to an open truck and bumper of an automobile which are susceptible of a low cost of manufacture with regard to both materials and labor, and which accordingly are then susceptible of low prices of sale to the consuming public, thereby making such a sport utility seat for removable attachment to an open truck and bumper of an automobile economically available to the buying public.

Still yet another object of the present invention is to provide a new and improved sport utility seat for removable attachment to an open truck and bumper of an automobile which provides in the apparatuses and methods of the prior art some of the advantages thereof, while simultaneously overcoming some of the disadvantages normally associated therewith.

Even still another object of the present invention is to removably position a sports utility seat over an open trunk and bumper of an automobile.

Lastly, it is an object of the present invention to provide a sport utility seat for removable attachment to an open truck and bumper of an automobile section comprising a seat portion formed in a rectangular configuration and positionable in a horizontal orientation with side edges and a front and a rear edge and with an upper surface and a lower surface; a back portion formed in a rectangular configuration and positionable in a vertical orientation with a front surface, side edges and a top and bottom edge and with a rear surface, the top and bottom edges being of a length essentially equal to the front and rear edges of the seat portion; a pair of hinges coupling the back and seat portions; a pair of inverted U-shaped clamping members with vertical legs and a cross piece secured to the rear surface of the back portion with two associated coupling bolts for each member, the upper extent of each member being at a height beneath the upper edge of the back portion and extending downwardly to a central extent of the back portion; and an adjustable wing nut extending through the leg of each member remote from the bolts and adjacent to a lower extent thereof with a hemispherical cup secured to the free end of the nut interior of the member with an operator control member exterior thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
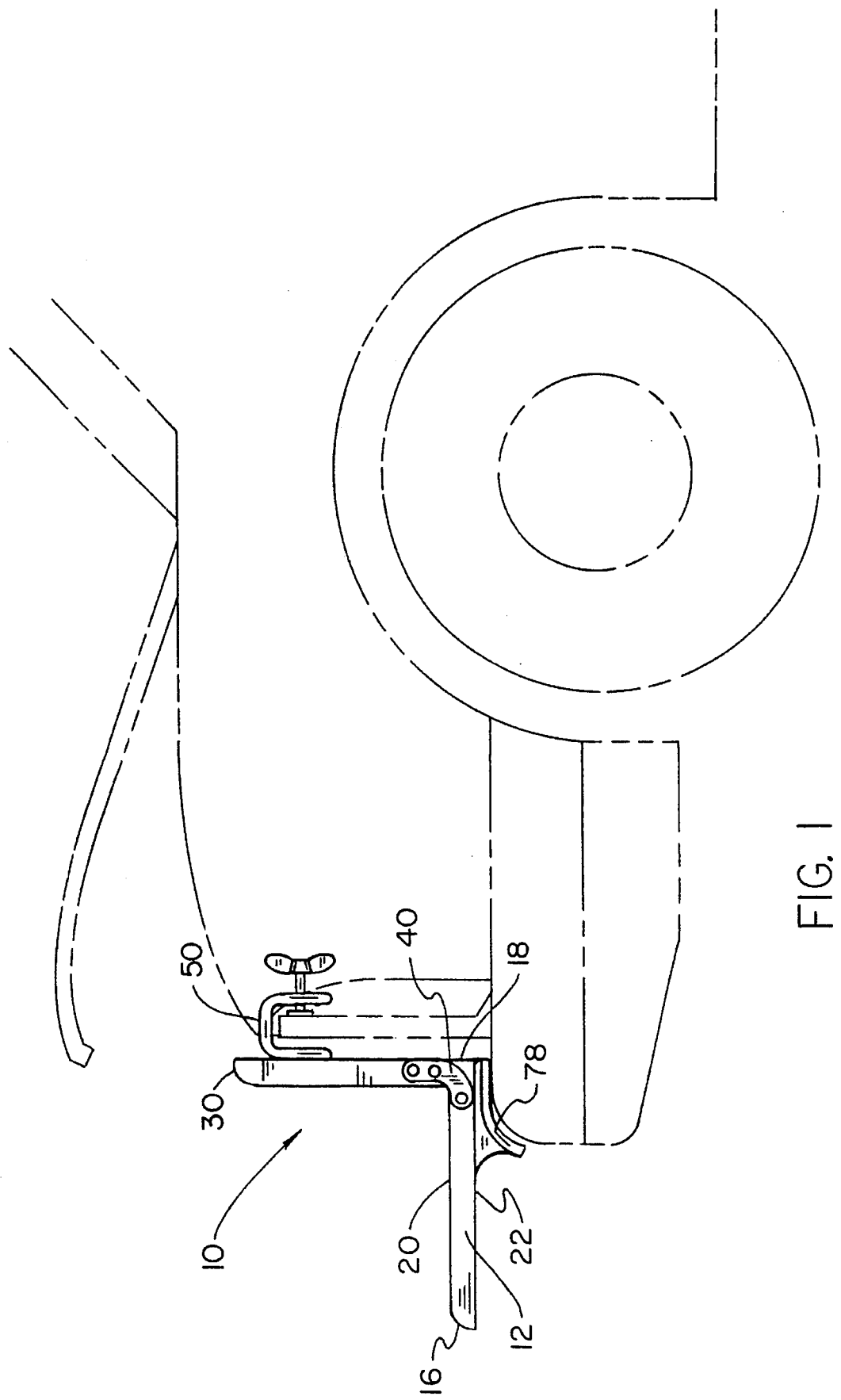
FIG. 1 is a side elevational view of the preferred embodiment of the new and improved sport utility seat for removable attachment to an open truck and bumper of an automobile constructed with accordance with the principles of the present invention.
Figure 2:
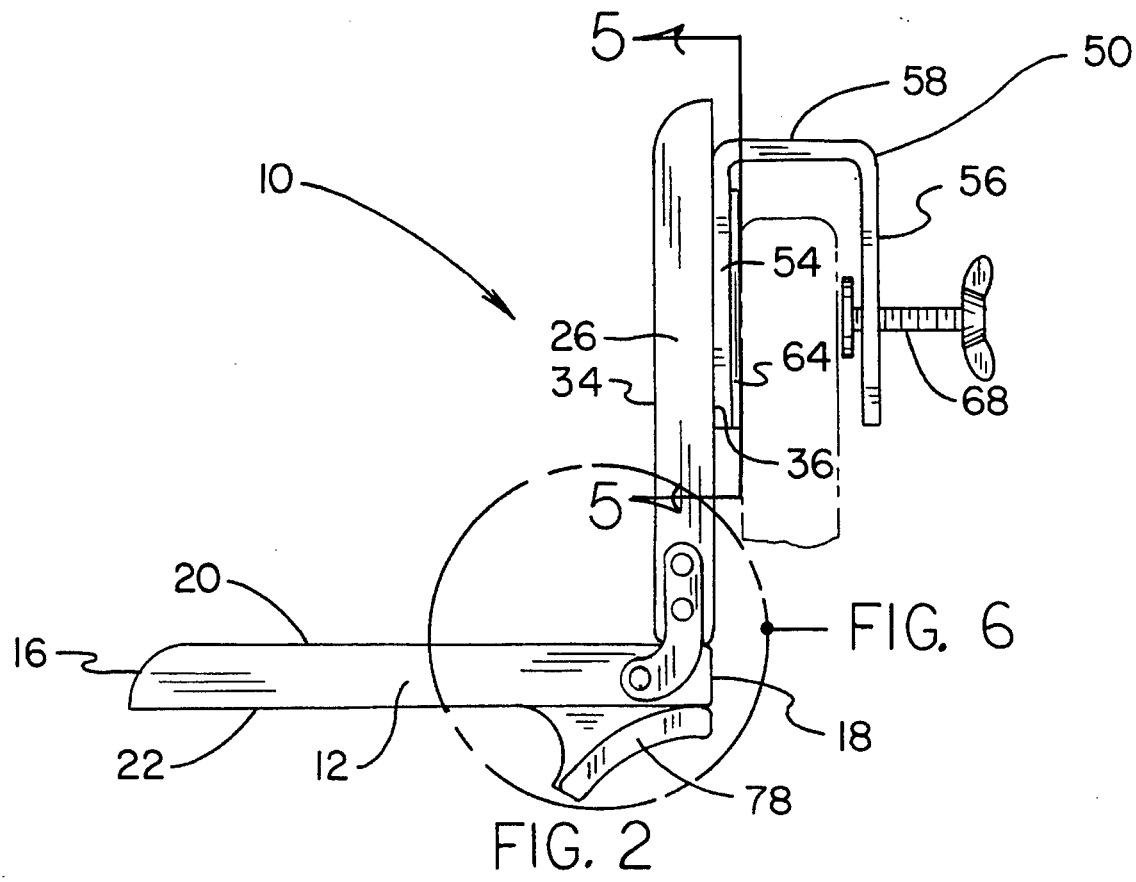
FIG. 2 is an enlarged side elevational view of the device shown in FIG. 1.
Figure 3:
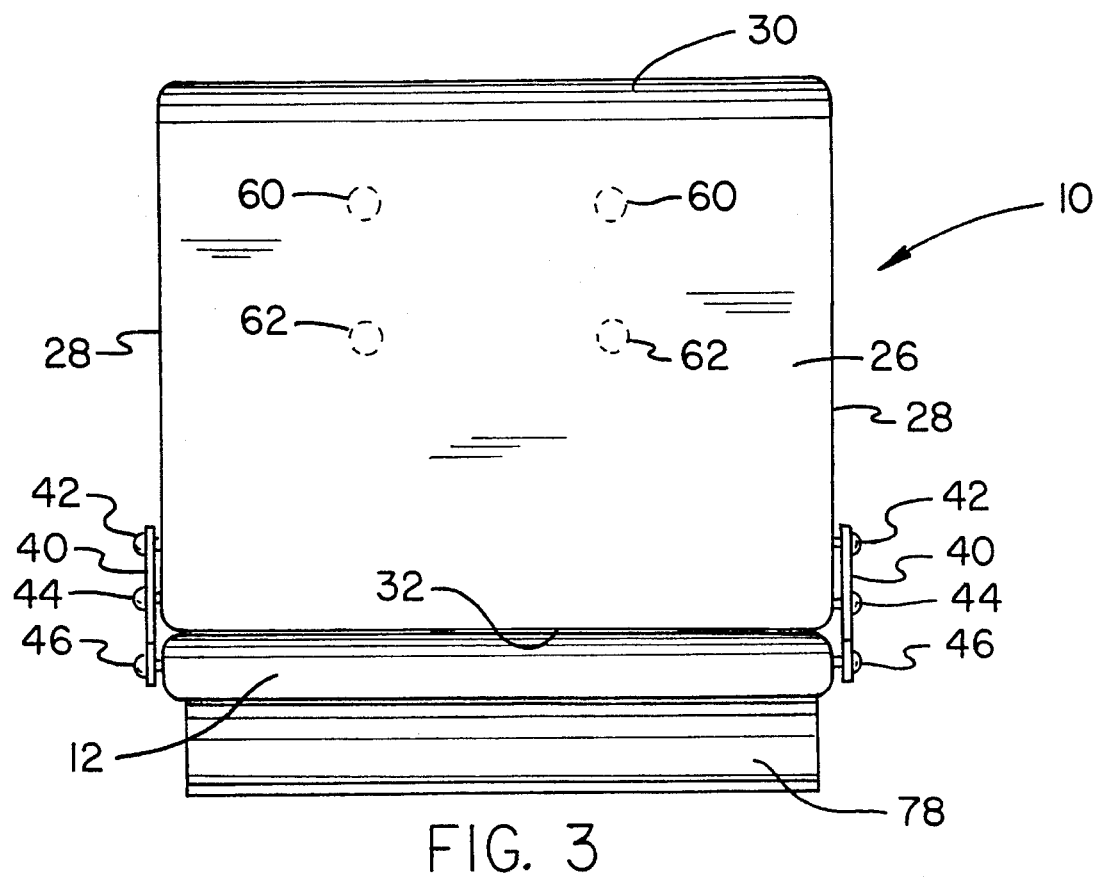
FIG. 3 is a front elevational view of the device shown in FIGS. 1 and 2.
Figure 4:
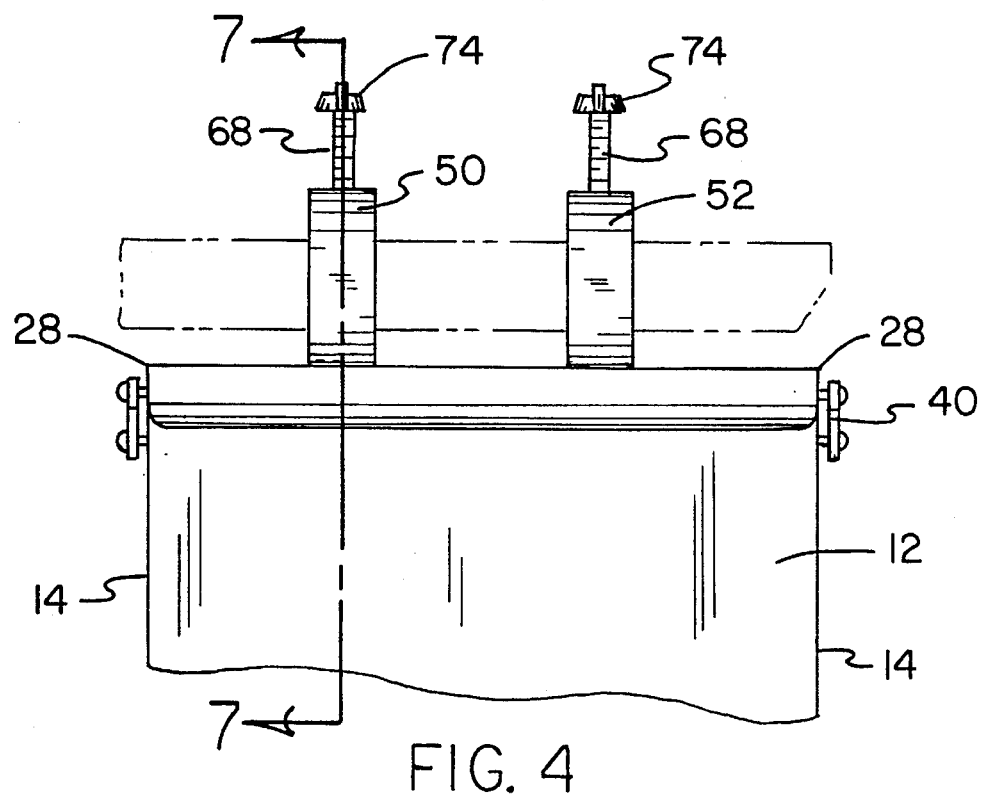
FIG. 4 is a partial top elevational view of the device shown in the prior Figures.
Figure 5:
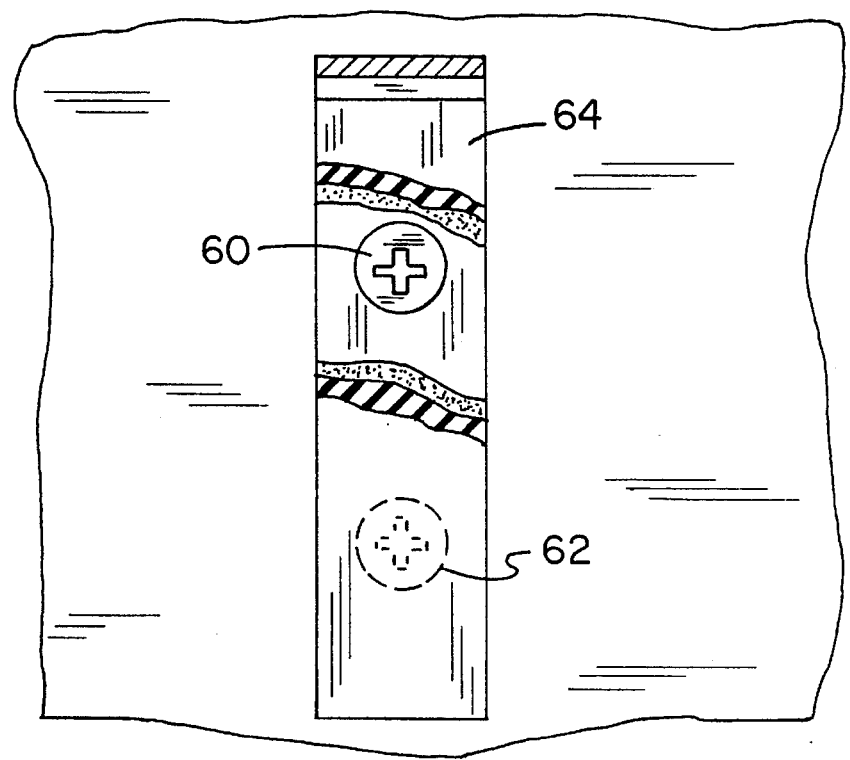
FIG. 5 is a cross-sectional view taken along line 5—5 of FIG. 2 with parts removed to show certain internal constructions thereof.
Figure 6:
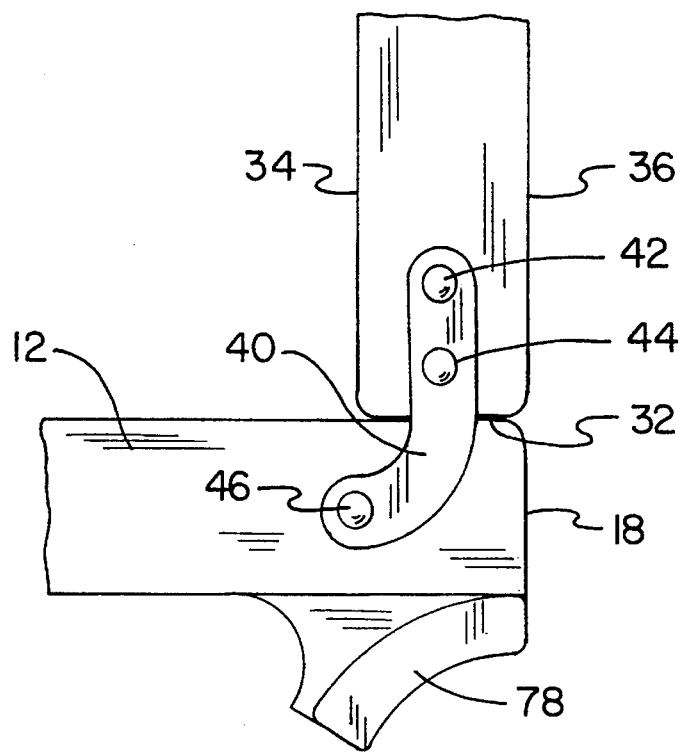
FIG. 6 is an enlarged side elevational view of the hinge area illustrated FIGS. 1, 2, 3 and 4.
Figure 7:
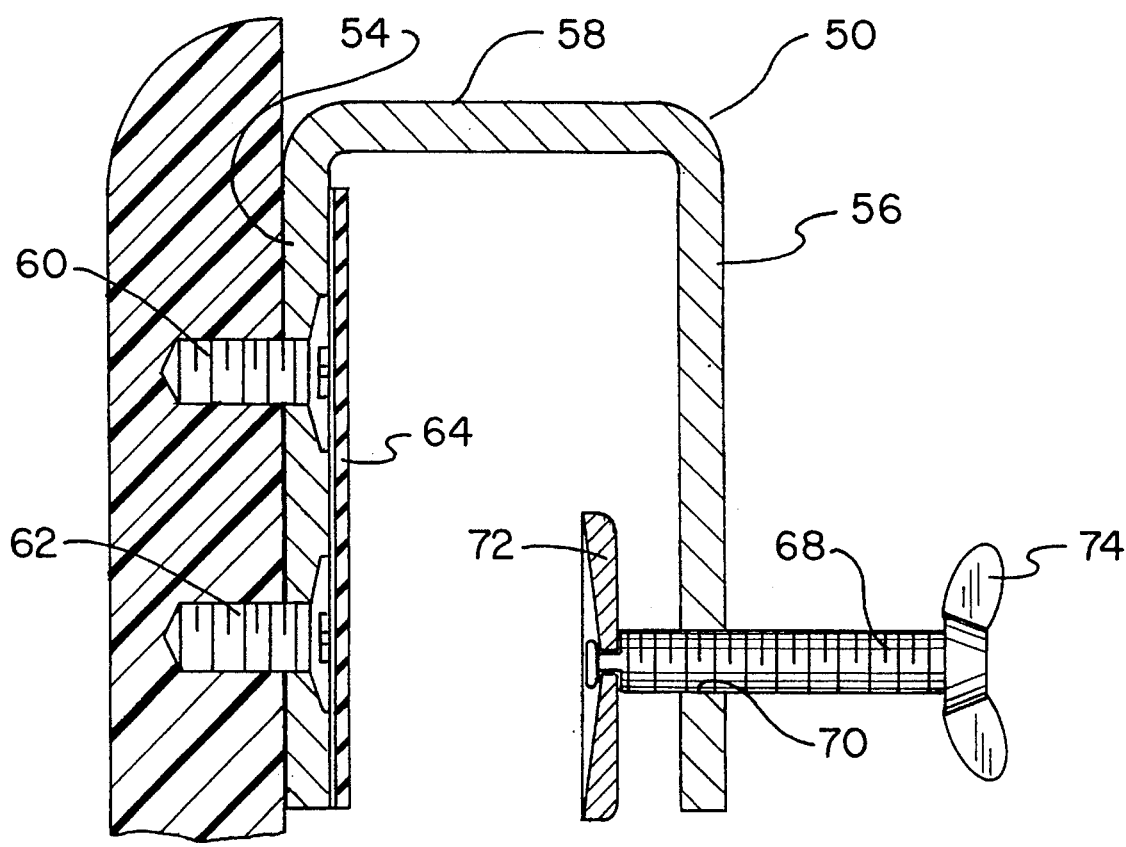
FIG. 7 is a cross-sectional view taken along line 7—7 of FIG. 4.

With reference now to the drawings, and in particular to FIGS. 1 through 7 thereof, the preferred embodiment of the new and improved sport utility seat for removable attachment to an open truck and bumper of an automobile embodying the principles and concepts of the present invention and generally designated by the reference numeral 10 will be described.

The present invention, the new and improved sport utility seat for removable attachment to an open truck and bumper of an automobile is a system comprised of a plurality of components. In its broadest context, the device 10 of the present invention includes a seat portion, a back portion, a pair of hinges, a pair of inverted U-shaped clamps, an adjustable wing nut and a support bracket. Each of the individual components is specifically configured and correlated one with respect to the other to attain the desired objectives.

More specifically, the seat portion 12 is formed in a rectangular configuration. During operation and use it is positionable in a horizontal orientation. It has parallel side edges 14 as well as a front edge 16 and a rear edge 18. In addition, it has an upper surface 20 and a lower surface 22.

The back portion 26 of the seat 10 is also formed in a rectangular configuration. During operation and use it is positionable in a vertical orientation. It has side edges 28 as well as a top edge 30 and a bottom edge 32. It also has a front surface 34 and a rear surface 36. The top and bottom edges are of a length essentially equal to the front and rear edges of the seat portion. The side edges of the back portion of a length less than the side edges of the seat portion.

Next provided are a pair of hinges 40. The hinges are secured to the lower side edges of the back portion as well as the rear side edges of the seat portion. Each hinge includes a pair of pins 42, 44 secured through the hinge and coupled to the back portion. A single pivot pin 46 couples the lower portion of the hinge and the seat at a location forwardly of the forward surface of the back portion. This thereby allows the upward pivoting of the seat portion into a parallel orientation with the back portion.

A pair of inverted U-shaped clamping members 50, 52 are next provided. The clamping members are of a similar construction with the vertical legs 54, 56 and a cross piece 58. Such clamping members are secured to the rear surface of the back portion with two associated coupling bolts 60, 62 for each member. The upper cross piece of each member is at a location and height beneath the upper edge of the back portion. The legs of each member extend downwardly to a central extent of the back portion. A cover sheet 64 is secured to the interior surface of one leg of each member for the purpose of covering the heads of the bolts to minimize damage to the car during attachment when the seat is in operation and use.

An adjustable wing nut 68 is threadedly positioned through a threaded aperture 70 in the leg of each clamping member remote from the bolts. Such wing nut is adjacent to the lower extent of its leg. On its interior face is a hemispherical cup 72 secured to the free end of the nut at a location interior of the clamping member. Such is to effect a gripping contact between the cup-shaped member and the back of the seat when the seat is positioned on the open bumper of an automobile. An operator controlled wing 74 is exterior of the U-shaped member at the exterior end of the wing nut.

The final component of the seat 10 is a support bracket 78. The support bracket extends downwardly from the lower surface of the seat portion adjacent to the rear edge thereof. It is shaped with an arcuate surface 80 in a configuration for resting on the bumper of an automobile when the inverted U-shaped member is secured to the rear of the trunk area when the trunk is opened. The support bracket helps keep the seat from moving downwardly while the U-shaped clamping member precludes the seat from moving forwardly. Together such components provide for greater safety for the seat during operation and use.

The present invention is designed for use by sports and outdoors people. It is designed to fit over an open trunk and bumper of an automobile, and is intended for use by golfers, recreational sports enthusiasts, those who enjoy participating in tailgate parties, and anyone who enjoys the outdoors. The present invention is a plastic seat, molded in one piece or made with hinges where the seat and back meet so that it is collapsible for easy storage and transport.

The seat has no legs, but instead it has a padded support section fastened to the bottom rear portion of the seat for the purpose of placing it on the rear bumper for support. Two flat, C-shaped hooks are fastened to the upper back of the seat and are used to hook over the lip of a car's open trunk.

To use the present invention, one opens the car's trunk, places the seat in the location mentioned above, and secures it in place. Once in place, a person can sit on the present invention while putting on his/her shoes or other sports apparel, or while watching a sporting event or simply viewing the scenery.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved sport utility seat for removable attachment to an open truck and bumper of an automobile comprising, in combination:

a seat portion formed in a rectangular configuration and positionable in a horizontal orientation with side edges and a front and a rear edge and with an upper surface and a lower surface;

a back portion formed in a rectangular configuration and positionable in a vertical orientation with a front surface, side edges and a top and bottom edge and with a rear surface, the top and bottom edges being of a length essentially equal to the front and rear edges of the seat portion and with the side edges of the back portion being of a length less than the side edges of the seat portion;

a pair of hinges secured to the lower side edges of the back portion and the rear side edges of the seat portion, each hinge including a pair of pins secured through the hinge and coupled to the back portion with a single pivotable pin coupling the lower portion of the hinge and the seat portion forwardly of the front surface of the back portion to thereby allow the upward pivoting of the seat portion into a parallel orientation with the back portion;

a pair of inverted U-shaped clamping members with vertical legs and a cross piece secured to the rear surface of the back portion with two associated coupling bolts for each member, the upper extent of each member being at a height beneath the upper edge of the back portion and extending downwardly to a central extent of the back portion with a cover sheet secured to the interior surface of one leg of the member to cover the heads of the bolts;

an adjustable wing nut extending through the leg of each member remote from the bolts and adjacent to a lower extent thereof with a hemispherical cup secured to the free end of the nut interior of the member with an operator control member exterior thereof; and a support bracket extending downwardly from the lower surface of the seat portion in an arcuate configuration for resting on the bumper of an automobile when the inverted U-shaped member is secured to the rear of the trunk area when the trunk is open.

* * * * *